United States Patent [19]
Ver Meer

[11] Patent Number: 5,194,758
[45] Date of Patent: Mar. 16, 1993

[54] AUTOMATIC SWITCHING CIRCUIT

[76] Inventor: James V. Ver Meer, 1700 Sylvan Cir., Brandon, S. Dak. 57005

[21] Appl. No.: 522,643

[22] Filed: May 14, 1990

[51] Int. Cl.$^5$ .............................................. H01H 9/00
[52] U.S. Cl. .................................... 307/112; 307/125; 307/127; 307/139
[58] Field of Search ............... 307/112, 113, 125, 127, 307/129, 130, 131, 139

[56] References Cited

U.S. PATENT DOCUMENTS

| | | | |
|---|---|---|---|
| 3,624,338 | 8/1970 | Ellis et al. | 307/127 |
| 3,626,201 | 12/1971 | Chambers, Jr. | 307/127 |
| 3,648,059 | 3/1972 | Beudry et al. | 307/127 |
| 3,731,179 | 5/1973 | Rademaker | 307/127 |
| 4,532,569 | 7/1985 | Salcedo | 307/127 |

Primary Examiner—Jeffrey A. Gaffin
Attorney, Agent, or Firm—Edmond T. Patnaude

[57] ABSTRACT

Voltage sensing circuitry monitors the signal input lines of a standard RS232 serial data interface. The voltage levels at the inputs of the interface are compared to known voltages to determine if the correct interconnections have been made between the interfaced devices. If the interconnections are determined to be incorrect, a switching circuit is enabled to correct the faulty connections, and serial data transmission is thereafter initiated.

7 Claims, 1 Drawing Sheet

AUTOMATIC SWITCHING CIRCUIT

The present invention relates to a new and improved automatic switching circuit and method for monitoring and controlling the interface between two pieces of equipment, and it relates more particularly to a method and apparatus for monitoring the voltage levels of the input signals to the input ports of an RS232 type interface and for automatically switching the input signals from one input port to another when the polarities of the input signals do not respectively match reference voltages of known values.

BACKGROUND OF THE INVENTION

The Electronics Industry Association (EIA) has provided standards for electrical, mechanical and functional interfaces between terminals, teletypes, CRTs, PCs and other types of data terminal equipment, known collectively as DATA Terminal Equipment or DTEs, and other communications equipment such as instruments, modems, and printers, known collectively as DATA Communications Equipment or DCEs. The RS232 Standard is the oldest and most widely used data interface standard for connections between DTEs and DCEs.

Typically, a DTE device is connected to a DCE device or another DTE device by means of a cable having as many as twenty-five signal lines which carry both data signals and control signals such as test signals and timing control information. Although the EIA Standard for connecting a cable to an RS232 interface is the most widely accepted cable configuration, it may not always be fully implemented or adhered to. With the increase of computing networks, DTE to DTE interfaces, and intelligent modems and printers, installation of an RS232 cable which has been properly configured for the particular installation has become a major concern. It would be desirable to provide a device or circuit which automatically configures the interface ports of an improperly configured interface cable to permit its use.

SUMMARY OF THE INVENTION

Briefly, there is provided in accordance with the present invention a voltage level monitoring and switching circuit which is connected to the input ports of an RS232 standard interface. When the interface is enabled or turned on, a switch is activated to reverse the two data line connections to the RS232 cable, and then the voltage levels at the input terminals of the interface are compared to a known set of voltage levels. If the correct voltages are present at the input terminals, communication through the interface can begin. On the other hand, if the voltages are incorrect, the switching circuit is again activated to switch the data lines to the other inputs of the receiving device interface and the comparison of the input voltages to the correct reference voltages is then repeated. If found to be correct, communication can begin through the interface.

GENERAL DESCRIPTION OF THE DRAWINGS

Further objects and advantages and a better understanding of the present invention will be had by reference to the following detailed description taken in connection with the accompanying drawings wherein:

FIG. 1 is a block diagram of a DTE and a DCE interconnected by an RS232 standard interface cable; and FIG. 2 is a block diagram of a monitoring and switching circuit embodying the present invention.

DETAILED DESCRIPTION OF A PREFERRED EMBODIMENT OF THE INVENTION

Figure 1:
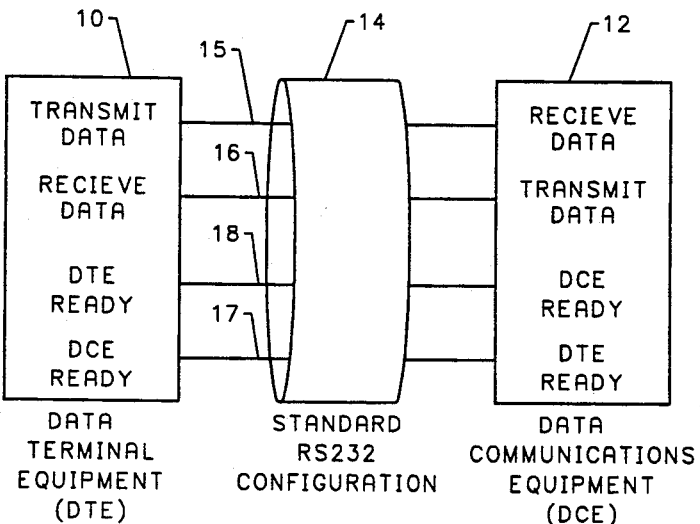

Referring to FIG. 1 there is shown a portion of the Standard RS232 Interface port assignment between a piece of Data Terminal Equipment (DTE) generally designated by the reference numeral 10 and a piece of Data Communications Equipment (DCE) generally designated by the reference numeral 12. A standard interface cable designated 14 is connected between the terminals of the devices 10 and 12. As shown, the interface cable provides a one to one wiring connection for a DTE/DCE interface. It contains four main signal lines, namely, a Transmit Data signal line 15, a Receive Data signal line 16, a DTE Ready signal line 17, and a DCE Ready signal line 18. It will be understood by those skilled in the art that the cable 14 will ordinarily include more signal lines than are shown in the drawing. In the standard RS232 format a "1", "Mark" or "Off" signal has a voltage level between $-3$ and $-30$ volts and a "0", "Space" or "On" signal has a voltage level between $+3$ and $+30$ volts. These voltage levels are referenced to ground potential.

Figure 2:
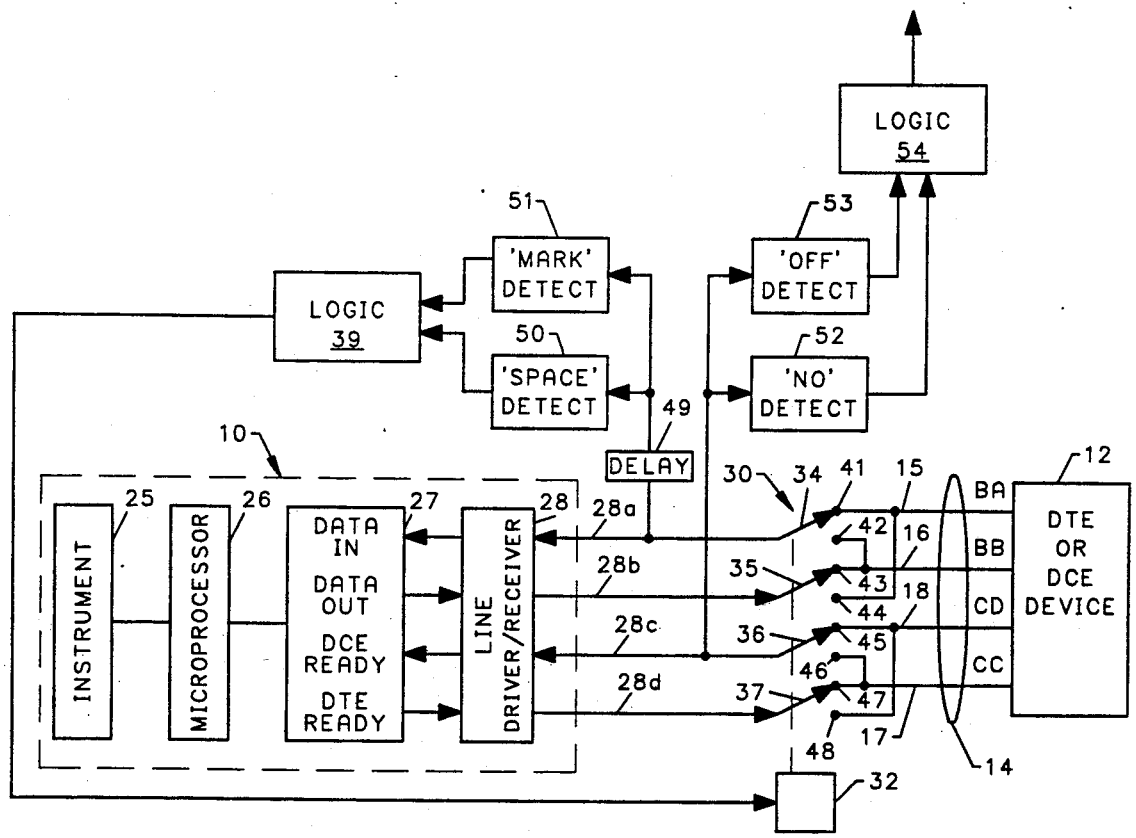

Referring to FIG. 2, the communication equipment 10 may be seen to include an instrument 25 which is connected to a microprocessor 26 containing two memory buffers. A standard UART (universal asynchronous transmitter receiver) 27, converts parallel data used by the instrument 26 into the serial format required for RS232 transmission. One of the buffers in the microprocessor 26 buffers information coming from the instrument 25 and the other buffer buffers information coming from the UART 27. Also included in the DTE 10 is a standard line driver/receiver 28 which couples the UART 27 to the RS232 cable 14. A conventional disconnect jack may be connected in the cable 14. As in FIG. 1, only four signal lines 15, 16, 17 and 18 are shown, but it will be understood by those skilled in the art that additional lines may be included in the cable 14. The cable 14 is shown to be connected at its other end to a DTE or DCE device 12.

In accordance with the present invention an automatic switching circuit is connected in the data signal lines which connect to circuits BA and BB to the line driver/receiver 28 and also in the handshaking signal lines which connect CC and CD to the line driver/receiver 28. The automatic switching circuit of the present invention may be seen to include a four pole double throw switching relay 30 comprising a pickup coil or solenoid 32 which is operatively connected to four common wipers 34, 35, 36, and 37 which are electrically connected to the terminals 28a, 28b, 28c and 28d of the line driver/receiver 28. The relay 30 is under the control of a logic circuit 39 which toggles the wipers from one position to the other.

The wiper 34 is toggled between a pair of contacts 41 and 42 which are respectively connected to data signal lines BA and BB of the RS232 cable 14. The wiper 35 is toggled between a pair of contacts 43 and 44 which are respectively connected to the data signal lines BB and BA (15 and 16) of the cable 14. Consequently, in one position of the relay 30 the data signal line BA is connected to the data input/receiver of driver/receiver 28 and the data signal line BB is connected to the data output/driver of the device 28, while in the other relay position the line BB is connected to data input/receiver and the line BA is connected to the data output/driver of device 28.

The RS232 cable 14 also includes a pair of handshaking signal lines 17 and 18 (CD and CC) which are adapted to couple the handshaking circuits of the device 12 to the handshaking circuits of the UART 27 via the terminals 28c and 28d. As shown, the common switch wiper 36 is directly connected to handshaking input/receiver terminal 28c of the line driver/receiver 28 and its associated contacts 45 and 46 are respectively connected to the handshaking lines CD and CC of the cable 14. The switch wiper 37 is directly connected to terminal 28d of the input/receiver, and its contacts are connected to the handshaking lines CC and CD of the cable 14. Consequently, in the relay position illustrated in the drawing the cable lines CD and CC are respectively connected to the handshaking input and output terminals 28c and 28d of the device 28, while in the other switch position the lines CD and CC are respectively connected to the input and output terminals 28c and 28d of device 28.

When the system is first enabled, the logic circuit toggles the switch from its initial position to the other position, and after a short time delay effected by a time delay circuit 49 the signal on BA is sensed by a pair of "space" and "mark" detectors 50 and 51. The time delay is sufficient to permit any transient signals on the line caused by the switching operation to decay to an insignificant level, i.e. less than +3 or greater than −3 volts. If line BA is either in the range of +3 to +30 volts or in the range of −3 to −30 volts, the relay remains in its then present position and communication can begin. If neither a "mark" nor a "space" signal is detected by the detectors 50 and 51, the logic circuit 39 toggles the relay to the other relay position, and after a brief time delay the signal sensing sequence is repeated. If a "mark" or a "space" is then detected, communication between the devices 10 and 12 can begin.

Many RS232 devices will not assert their BA handshaking circuit until an "On" is detected on the CC input circuit. With the system of the present invention, the CD circuit output signal will be asserted when the relay is set, and this will provide the proper stimulus for the other device to assert its data output.

In order to provide an indication of whether the relay 30 is set up to use hardware handshaking, a pair of "On" and "Off" detectors 52 and 53 similar to the "mark" and "space" detectors 50 and 51 and a second logic circuit 54 are provided. The inputs to the detectors 52 and 53 are connected to the circuit CD. If hardware shaking is being used, either an "Off" or an "On" signal will be present on circuit CD and a signal at the output of the logic circuit 54 will so indicate. This information can be useful to the local controller.

The logic circuits 39 and 54 are identical and both execute the following truth table:

| Mark/Off | Space/On | Output |
|---|---|---|
| Inactive | Inactive | Output |
| Inactive | Active | Output |
| Active | Inactive | Output |
| Active | Active | Cannot occur |

It will be seen that the system of the present invention switches the connections to the data input and data output terminals 28a and 28b, until the BA circuit of the device 12 is connected to terminal 28b and an active output, a "mark" signal at a voltage level in the range of −3 to −30 volts or a "space" signal at a voltage in the range of +3 to +30 volts is present at the data input terminal 28b. In addition, the handshaking signal on terminal 28c is monitored to provide an indication at the output of the logic circuit 54 of whether hardware handshaking has been effected.

While the present invention has been described in connection with a particular embodiment thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. An automatic switching system for use with an RS232 type interface between digital devices utilizing serial transmission of information via a plurality of data carrying signal lines connected between said devices comprising in combination
   first means for sensing a negative voltage on one of said lines,
   second means for sensing a positive voltage on said one of said lines,
   switching means connected in said one and said another of said lines, and
   means responsive to said first and second means for enabling said switching means to reverse the connections of said data carrying signal lines to one of said devices.

2. An automatic switching system according to claim 1, comprising
   means responsive to the operation of said switching means for enabling said first and second sensing means to sense said positive and negative voltages on said line.

3. An automatic switching system according to claim 2, comprising
   time delay means for delaying the sensing of said positive and negative voltages for a sufficient time to permit any transients on said lines to decay to an insignificant level.

4. A method of switching the connections between first and second lines adapted to have signals thereon and first and second signal lines, comprising the steps of
   sensing the signal level on one of said first and second signal lines,
   comparing the sensed signal level to first and second reference levels to determine if said signal level corresponds to either of said reference levels, and
   if said signal level does not correspond to either of said reference signals, switching said first and second lines from the ones of said terminals to which they are connected to the other ones of said terminals.

5. A method according to claim 4, comprising the further steps of
   after said step of switching, again sensing the level of the signal on said one of said lines and comparing the second sensed signal level with said reference levels, and
   if said second sensed signal level still does not correspond to either of said reference levels, again switching said first and second lines from the ones of said terminals to which they are connected to the other ones of said terminals.

6. A method according to claim 4, further comprising the step of delaying said step of comparing for a sufficient time following said step of switching to permit any transients in said signals to decay to an insignificant level.

7. A method according to claim 4 wherein said reference levels comprise a first range of positive voltages and a second range of negative voltages.

* * * * *

UNITED STATES PATENT AND TRADEMARK OFFICE
CERTIFICATE OF CORRECTION

PATENT NO. : 5,194,758
DATED : March 16, 1993
INVENTOR(S) : James V. Ver Meer

It is certified that error appears in the above—identified patent and that said Letters Patent is hereby corrected as shown below:

In column 5, line 3, after "claim" delete "4" and substitute --5--.

Signed and Sealed this

Fourteenth Day of December, 1993

*Attest:*

BRUCE LEHMAN

*Attesting Officer*     *Commissioner of Patents and Trademarks*